US012090431B2

United States Patent
Smith et al.

(10) Patent No.: US 12,090,431 B2
(45) Date of Patent: Sep. 17, 2024

(54) SOY BASED FILTRATION SYSTEM

(71) Applicant: Purdue Research Foundation, West Lafayette, IN (US)

(72) Inventors: Anderson Smith, Fort Wayne, IN (US); Andrew Huang, West Lafayette, IN (US); Sushant Mehan, West Lafayette, IN (US); Samaneh Saadat, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/201,030

(22) Filed: May 23, 2023

(65) Prior Publication Data

US 2023/0285883 A1    Sep. 14, 2023

Related U.S. Application Data

(62) Division of application No. 16/493,984, filed as application No. PCT/US2018/024434 on Mar. 27, 2018, now Pat. No. 11,691,099.

(60) Provisional application No. 62/476,894, filed on Mar. 27, 2017.

(51) Int. Cl.
| | | |
|---|---|---|
| *B01D 53/02* | (2006.01) | |
| *B01D 39/16* | (2006.01) | |
| *B01D 39/18* | (2006.01) | |
| *B01J 20/24* | (2006.01) | |
| *B01J 20/28* | (2006.01) | |
| *B01J 20/30* | (2006.01) | |
| *D21H 11/12* | (2006.01) | |
| *D21H 11/14* | (2006.01) | |
| *D21H 15/10* | (2006.01) | |
| *D21H 27/08* | (2006.01) | |

(52) U.S. Cl.
CPC ..... *B01D 39/1615* (2013.01); *B01D 39/1623* (2013.01); *B01D 39/18* (2013.01); *B01J 20/24* (2013.01); *B01J 20/28023* (2013.01); *B01J 20/28038* (2013.01); *B01J 20/3007* (2013.01); *B01J 20/3021* (2013.01); *B01J 20/3071* (2013.01); *B01J 20/3085* (2013.01); *D21H 11/12* (2013.01); *D21H 11/14* (2013.01); *D21H 15/10* (2013.01); *D21H 27/08* (2013.01); *B01D 2239/0283* (2013.01); *B01D 2239/04* (2013.01); *B01D 2239/064* (2013.01); *B01D 2239/1258* (2013.01); *B01J 2220/44* (2013.01)

(58) Field of Classification Search
CPC ........ B01D 2239/0283; B01D 2239/04; B01D 2239/064; B01D 2239/1258; B01D 39/16; B01D 39/1615; B01D 39/1623; B01D 39/18; B01J 20/24; B01J 20/28023; B01J 20/28038; B01J 20/3007; B01J 20/3021; B01J 20/3071; B01J 20/3085; B01J 2220/44; D21H 11/12; D21H 11/14; D21H 15/10; D21H 27/08
See application file for complete search history.

(56) References Cited

U.S. PATENT DOCUMENTS

| | | | |
|---|---|---|---|
| 2,928,399 A * | 3/1960 | Touey | B01D 39/18 |
| | | | 131/342 |
| 6,029,395 A | 2/2000 | Morgan | |
| 2010/0197185 A1 | 8/2010 | Herbert | |

OTHER PUBLICATIONS

International Search Report and Written Opinion issued by the ISA/US, Commissioner for Patents, mailed Jun. 11, 2018, for International PCT Application No. PCT/US2018/024434.
Liu, C., et al., "Soy protein isolate/baterial cellulose composite membranes for high efficiency particulate air filtration", Composites Science and Technology 138, pp. 124-133 (2017).
Gallegos, et al. "Bacterial Cellulose", BioResources, 11(2), 1-15 (2016).
Lee, et al., "On the sue of nanocellulose as reinforcement in polymer matrix composites", Composites Science and Technology 105, pp. 15-27 (2014).
Zhang, et al., "Growth-inducing effects of argon plasma on soybean sprouts", Scientific Reports 7:41917 (2017).
Hilding, Tina "Researchers develop environmentally friendly, soy air filter", WSU Insider, Washington State University. Jan. 12, 2017.
Souzandeh, et al., "Soy-Protein-based nanofabrics for highly efficient and multifunctional air filtration" ACS Applied Materials & Interfaces 2016, 8, 20023-20031.

* cited by examiner

*Primary Examiner* — Christopher P Jones
(74) *Attorney, Agent, or Firm* — Purdue Research Foundation

(57) ABSTRACT

The present application relates generally to filter media useful for manufacturing air filters for residential and commercial office's Heating, Ventilation, and Air Conditioning (HVAC), particularly to filters and filter media comprising soybean-based materials. The present invention provides an inexpensive, effective, environmentally friendly, and sustainable media for manufacturing HVAC air filters for residential and commercial buildings.

8 Claims, No Drawings

SOY BASED FILTRATION SYSTEM

CROSS-REFERENCE TO RELATED APPLICATIONS

The present U.S. patent application is a divisional of U.S. patent application Ser. No. 16/493,984 filed Sep. 13, 2019, which is the national stage application under 35 U.S.C. § 371(b) of International Application No. PCT/US18/24434, filed Mar. 27, 2018, which is related to and claims the priority benefit under 35 U.S.C. § 119(e) to of U.S. Provisional Patent Application No. 62/476,894, filed Mar. 27, 2017, the contents of which are hereby incorporated by reference in their entirety into the present disclosure.

TECHNICAL FIELD

The present application relates generally to filter media useful for manufacturing air filters for residential and commercial office's Heating, Ventilation, and Air Conditioning (HVAC), particularly to filters and filter media comprising soybean-based materials.

BACKGROUND

This section introduces aspects that may help facilitate a better understanding of the disclosure. Accordingly, these statements are to be read in this light and are not to be understood as admissions about what is or is not prior art.

Home and commercial office's Heating, Ventilation, and Air Conditioning (HVAC) filters are a necessity in order to ensure good indoor air quality within both residential and commercial buildings. They continuously clean the air, providing for a safe and healthy environment in which people can live and work. Without air filters, particulate matter, allergens, and mold would accumulate within buildings, making the air both unpleasant and unsafe to breathe. Any air filter is a step up from no air filter; yet, a problem exists in the HVAC air filter market. Current offerings are either relatively effective when it comes to filtration but are expensive, or relatively cheap but have poor filtration efficiency. Additionally, many air filters are made from petroleum-based products, thus presenting environmental hazards. There are unmet needs for an environmentally friendly, sustainable and affordable materials for manufacturing HVAC filters.

SUMMARY OF THE INVENTION

The present invention provides an inexpensive, effective, and sustainable HVAC air filter. The filter disclosed herein is, in one embodiment, a soy-based HVAC (Heating, Ventilation, and Air Conditioning) filter for use in residential and commercial applications. Testing, based upon the American Society of Heating, Refrigerating, and Air-Conditioning Engineers (ASHRAE) Standard 52.2, has shown that an example filter is about 15% more effective than current HVAC filters available on the market. Additionally, the disclosed filter is less expensive to manufacture than currently existing HVAC filters. The filter disclosed is made from renewable resources and is biodegradable, making it much more environmentally friendly than currently existing products. The three aforementioned traits—high efficiency, low cost, and environmental friendliness—are all possible due to the unique properties of soy within the product. Furthermore, the product has experimentally gone through cold plasma treatment, which may extend the life of the product and at the same time allow for an even higher filtration efficiency due to the resultant surface charge held by the soy proteins.

While the disclosed embodiment is adapted for use in the HVAC sector, the soy-based filtration technology disclosed herein could be easily applied to numerous other industries going forward. These include, but are not limited to, the industrial and agricultural air filtration industries. Due to the physical properties of the product, simple alterations would also enable it to be applied to a wide number of other uses for paper and cardboard products such as paper towels, cardboard boxes, disposable coffee cup sleeves, and even wine corks.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

As used herein, the following terms and phrases shall have the meanings set forth below. Unless defined otherwise, all technical and scientific terms used herein have the same meaning as commonly understood to one of ordinary skill in the art.

In the present disclosure the term "about" can allow for a degree of variability in a value or range, for example, within 20%, within 10%, within 5%, or within 1% of a stated value or of a stated limit of a range.

In the present disclosure the term "substantially" can allow for a degree of variability in a value or range, for example, within 80%, within 90%, within 95%, or within 99% of a stated value or of a stated limit of a range. Soy and soybean are used exchangeably herein.

Filter media as disclosed herein refers to material compositions of a filter, or a component of a filter. And more specifically, the starting or intermediate materials used to prepare consumable filters, including Heating, Ventilation, and Air Conditioning air filters for use in residential and commercial applications.

In some illustrative embodiments, this present invention relates to a filter media comprising a component of milled whole soybean material and a component of recyclable materials.

In some illustrative embodiments, this present invention relates to a filter media disclosed herein, wherein said milled whole soybean material accounts for about 1% to about 90%.

In some illustrative embodiments, this present invention relates to a filter media disclosed herein, wherein said whole soybean material accounts for about 5% to about 80%.

In some illustrative embodiments, this present invention relates to a filter media disclosed herein, wherein said milled whole soybean material accounts for about 10% to about 70%.

In some illustrative embodiments, this present invention relates to a filter media disclosed herein, wherein said milled whole soybean material accounts for about 10% to about 60%.

In some illustrative embodiments, this present invention relates to a filter media disclosed herein, wherein said recyclable material is paper or synthetic fibrous material.

In some illustrative embodiments, this present invention relates to a filter media disclosed herein, wherein the said recyclable material is recycled paper.

In some illustrative embodiments, this present invention relates to a filter media disclosed herein, wherein said recyclable material is recycled synthetic fibrous material.

In some illustrative embodiments, this present invention relates to a filter media disclosed herein, wherein said recyclable material accounts for about 1% to about 90%.

In some embodiments, this present invention relates to a filter media disclosed herein, wherein said recyclable material accounts for about 5% to about 80%.

In some illustrative embodiments, this present invention relates to a filter media disclosed herein, wherein said recyclable material accounts for about 5% to about 70%.

In some illustrative embodiments, this present invention relates to a filter media disclosed herein, wherein said recyclable material accounts for about 5% to about 50%.

In some illustrative embodiments, this present invention relates to a filter media disclosed herein, wherein said recyclable material accounts for about 5% to about 40%.

In some illustrative embodiments, this present invention relates to a filter media disclosed herein, wherein said recyclable material accounts for about 10% to about 30%.

In some illustrative embodiments, this present invention relates to a filter media disclosed herein, wherein said filter media is used to prepare an air filter for residential or commercial heating, ventilation and air conditioning.

In some illustrative embodiments, this present invention relates to a filter media disclosed herein, wherein said filter media is used to manufacture an air filter.

In some illustrative embodiments, this present invention relates to a filter media disclosed herein, wherein said filter media is used to manufacture an air filter, wherein said filter has a Minimum Efficiency Reporting Value (MERV) ranging from about 3 to about 12.

In some illustrative embodiments, this present invention relates to a filter media disclosed herein, wherein said filter media is used to manufacture an air filter, wherein said filter is further exposed to cold plasma treatment.

In some illustrative embodiments, this present invention relates to an air filter comprising milled whole soybean material and a recyclable material.

In some illustrative embodiments, this present invention relates to an air filter comprising milled whole soybean material and a recyclable material, wherein said filter is further exposed to cold plasma treatment.

In some illustrative embodiments, this present invention relates to an air filter comprising milled whole soybean material and a recyclable material, wherein said milled whole soybean material accounts for about 1% to about 90%.

In some illustrative embodiments, this present invention relates to an air filter comprising milled whole soybean material and a recyclable material, wherein said milled whole soybean material accounts for about 10% to about 80%.

In some illustrative embodiments, this present invention relates to an air filter comprising milled whole soybean material and a recyclable material, wherein said recyclable material is paper or synthetic fibrous material.

In some illustrative embodiments, this present invention relates to an air filter comprising milled whole soybean material and a recyclable material, wherein said recyclable material is recycled paper.

In some illustrative embodiments, this present invention relates to an air filter comprising milled whole soybean material and a recyclable material, wherein said recyclable material is recycled synthetic fibrous material.

In some illustrative embodiments, this present invention relates to an air filter comprising milled whole soybean material and a recyclable material, wherein said recyclable material accounts for about 1% to about 90%.

In some illustrative embodiments, this present invention relates to an air filter comprising milled whole soybean material and a recyclable material, wherein said recyclable material accounts for about 5% to about 80%.

In some illustrative embodiments, this present invention relates to an air filter comprising milled whole soybean material and a recyclable material, wherein said recyclable material accounts for about 10% to about 70%.

In some illustrative embodiments, this present invention relates to an air filter comprising milled whole soybean material and a recyclable material, wherein said recyclable material accounts for about 10% to about 60%.

In some illustrative embodiments, this present invention relates to an air filter comprising milled whole soybean material and a recyclable material, wherein said milled whole soybean material accounts for about 10% to about 50%.

In some illustrative embodiments, this present invention relates to an air filter comprising milled whole soybean material and a recyclable material, wherein said milled whole soybean material accounts for about 10% to about 40%.

In some illustrative embodiments, this present invention relates to an air filter comprising milled whole soybean material and a recyclable material, wherein said milled whole soybean material accounts for about 10% to about 30%.

In some illustrative embodiments, this present invention relates to an air filter comprising milled whole soybean material and a recyclable material, wherein said milled whole soybean material accounts for about 10% to about 25%.

In some illustrative embodiments, this present invention relates to an air filter comprising milled whole soybean material and a recyclable material, wherein said milled whole soybean material accounts for about 10% to about 20%.

In some illustrative embodiments, this present invention relates to an air filter comprising milled whole soybean material and a recyclable material, wherein said filter is an air filter for residential or commercial heating, ventilation and air conditioning.

In some illustrative embodiments, this present invention relates to an air filter comprising milled whole soybean material and a recyclable material, wherein said filter has a Minimum Efficiency Reporting Value (MERV) ranging from about 3 to about 12.

Plasma is often considered as the fourth state of matter in addition to solid, liquid and gas phases. A plasma is a partially ionized gas in which ions and electrons are present as well as radicals and molecules in a excited state, which include both "hot" plasmas wherein species of the plasma have appropriately the same (high) temperature, and "cold" or "non-equilibrium" plasmas wherein plasmas have a high electron temperature but a low ion or gas temperature, with the latter being more widely used in modern manufacturing process. Cold plasma discharges can be generated by stationary and pulsed direct current (DC) or alternating current (AC) electrical fields. Various electrical power supplies can be used to generate the plasma discharges. Many commercial vendors manufacture and supply all kinds of instruments serving various purposes of cold plasmas, including surface treatment goods, such as Dyne Technology (UK), 3DT LLC (Germantown, WI), and Tri-Star Technologies (El Segundo, CA).

HVAC air filters are rated based on a scale known as the MERV (Minimum Efficiency Reporting Value) scale. MERV ranks filters from 1 to 20, with 1 being the least effective and 20 being the most. However, 12 is the maximum used for residential buildings, with 13-20 being reserved settings requiring extreme cleanliness, such as a surgery room.

A search of patent databases identified patent CN205549922-U and patent CN105622768-A. The first pertains to a water filter recycling machine. It describes a water filter and includes an animated soy straw layer within the filtration media. The latter of the two is a filtration cake used to extract plant soybean starch. This process has the purpose of filtering the starch from soybean itself.

A study published by Washington State University regarding a filtration media also pertains soy. However, the media developed at Washington State has a sole application to super high efficiency filters, as opposed to HVAC air filters. The type of extremely high efficiency filtration discussed by Washington State does not target an application to the HVAC industry as a dense filtration media because this would put too much strain on an HVAC system due to the high-pressure drop created by the lack of porosity within the filter. Furthermore, the media developed by Washington State uses only highly refined soy protein isolate, as opposed to whole soy (H. Souzandeh, et al., *ACS Sustainable Chem. Eng.,* 2017, 5 (7), pp 6209-6217; H. Souzandeh, et al., *ACS Appl. Mater. Interfaces,* 2016, 8 (31), pp 20023-20031).

As mentioned above, HVAC air filters are rated based on a scale known as the MERV (Minimum Efficiency Reporting Value) scale. MERV ranks filters from 1 to 20, with 1 being the least effective and 20 being the most. However, 12 is the maximum used for residential buildings. As such, testing between a filter as disclosed herein and a MERV 12 HVAC filter was carried out based upon the American Society of Heating, Refrigerating, and Air Conditioning Engineers (ASHRAE) standard 52.2, which is a standardized testing procedure used to determine the overall efficiency of HVAC filters. The testing was conducted at Purdue University. After numerous trials at seven different flow rates of air, the data showed that the filter disclosed herein outperformed a MERV 12 HVAC filter by 14.67%.

When it comes to cost of production, the cost to produce a filter as described herein is expected to be higher than that of a MERV 2 filter and slightly higher than that of a MERV 7 filter, but much lower than that of a MERV 12 filter. As mentioned above, the filter disclosed herein outperforms all three of the aforementioned filters.

Additionally, the filter disclosed herein is a soy and recycled paper-based product. Thus, it is both biodegradable and sustainably sourced. Currently existing high-efficiency filtration products are typically made from synthetic fibrous material or glass fiber, both of which are nonrenewable resources. As such, the disclosed filter provides a much more environmentally friendly filter than such existing high-efficiency filters.

The disclosed filters, which provide high filtration efficiency, low price point, and environmental friendliness, are well-suited for use by hotels and families that replace their filters regularly and are looking for cost savings while maintaining a high filtration efficiency, and filter sustainability. However, the disclosed filters could be used or adapted for use in nearly all HVAC systems in various settings and provides substantial advantages as summarized below:

High Filtration Efficiency
  Soy creates small pore spaces, allowing for filtration of fine particulate matter
  Amino groups within the soy proteins trap additional pollutants not captured by normal filters
Low Cost
  Soy is a cheap raw material
  Minimal processing is required to make soy into the final FiltraSoy filtration media
Environmentally Friendly
  Soy is a renewable resource
  Soy allows the main filtration media to be biodegradable
Cold Plasma Treatment
  The high protein content within soy allows it to effectively hold the surface charge achieved through cold plasma treatment.

In addition to HVAC applications, the filter described herein could also be adapted for applications in the automotive, industrial, and agricultural industries.

The process of producing the disclosed filters is relatively simple. The media itself is made in a fashion that is similar to a traditional paper making procedure. Care was taken to provide a media that was a smooth blend of recycled paper and soy material.

A general flowchart shows the overall process of producing the filtration media, some of the parameters include:
1. Type of recycle paper used
2. NaOH percentage mixed with the recycled paper
3. Grinding size for the soybean
4. NaOH percentage mixed with the soybean
5. Boiling temperature/time for the soybean and NaOH mixture
6. Overall ration of paper and soybean The creation of the filtration media results from the chemical and physical development of a soy-based mixture and a recycled paper-based mixture, the combination of these two mixtures, and then final physical processing in order to achieve the desired product form. This process is outlined below: First, paper was cut into designated sizes; namely, 1" squares so that the fiber material could be incorporated with soybean to form the base structure for the filter. Next, soybean was ground and milled, and a strong base was added to break down parts of the soybean which may decompose. Next, this slurry was washed to remove the base, and the mixture was incorporated to form a consistent slurry. This slurry was then sieved to form a filter, with pressure added to dry out the mixture and to form a homogeneous material.

Generation of the Filtration Media. From a technical aspect, the creation of the filtration media results from the chemical and physical development of a soy-based mixture and a recycled paper-based mixture, the combination of these two mixtures, and then final physical processing in order to achieve the desired product form.

1. Prepare recycled paper
  a) Cut recycled newspaper into 1 inch squares
  b) Combine the cut newspaper in a vat with just enough water to cover it
  c) Add NaOH (sodium hydroxide) to the mixture in a 1:4 ratio to the dry mass of the paper
  d) Allow the mixture to sit for 1 hour
  e) Rinse the mixture thoroughly to remove all NaOH 2. Prepare the soy mixture
   a) Grind soy into a fine powder (this was done with a Seedburo Equipment Company 60 hp grain mill on the fine #5 setting)
   b) Combine the soy in a vat with just enough water to cover it
   c) Add NaOH to mixture in a 1:9 ratio to the dry mass of the soy
   d) Heat the mixture to a boil
   e) Boil the mixture for 1 hour
   f) Rinse the mixture thoroughly to remove all NaOH
3. Blend the paper mixture with the soy mixture
   a) Combine the rinsed soy with the rinsed paper
      *This should be done with 91% soy, based upon its dry mass and 9% recycled paper, based upon its dry mass.
   b) Blend the two mixtures together on a high setting in a blender, adding water as necessary
   c) One a fine, smooth mixture is attained, pour the mixture into a 16 inch×24 inch tub
4. Sieve the paper
   a) Submerge a fine wire screen into the tub, lifting in gently to pull the solid material from the tub. Strive to achieve as uniform a layer as possible as this will be the filtration media itself
   b) Once a uniform layer has been gather, place a 9 inch×12 inch piece of felt on top of the layer on the screen
   c) Invert the screen, so that the media is sitting only on the felt
   d) Remove the screen
   e) Lay the media and felt on a flat, hard surface
   f) Press the media and felt repeatedly, using and absorbent material until most of the water has been extracted from the media
   g) Allow the media to dry for 24 hours
   h) After 24 hours, the media can be removed from the felt and is now ready for utilization Materials used in this process to produce the exemplary embodiment of the soy based filter is provided below: NaOH (Amazon); Soy Cloth (Simplifi Fabric); Paper-Making Physical Supplies (Walmart, Home Depot, Salvation Army); Air Filters for comparative testing and other supplies (Menards); Product packing and logo design (Purdue University).

Regarding filtration efficiency, the soybean content in the product decreases the pore space within the paper, allowing the air filter to trap more particulate matter. Additionally, the protein within soy contains 18 different amino groups, which allow the filter to capture many pollutants that are not typically captured through the physical filtration process that takes place in traditional air filters. These include very fine particulate matter and many gaseous pollutants. Furthermore, using cold plasma as a surface treatment sterilizes the surface of the filter and provides an induced surface charge due to the high protein content within the soybean components of the filter. Traditional filters on the market would not be able to hold this charge as effectively due to their low protein content. The product has undergone cold plasma treatment successfully, but in-depth testing as to a quantifiable improved performance of the cold plasma treated product has yet to be determined. The untreated product already outperforms high efficiency HVAC filters by 14.67 percent. With cold plasma treatment the protein groups within filter become charged and are expected to remove pollutants even more effectively than they already do. Due to the cold plasma treatment and resulting sterilization of the filter, the filter is expected to last longer and be less affected by decomposition.

The soy-based nature of the product also leads to its low price. Soy is a relatively cheap raw material input, thus saving money when compared to the other filter materials such as fiberglass or a synthetic material. Additionally, the process involved in making the filter is relatively simple with soybean and recycled paper being its two principal ingredients. It requires little processing when compared to the fiberglass and synthetic filters currently on the market, and contributes to the cost of production for the soy based filter described herein.

Additionally, the filter described herein is made of natural and renewable components (soy and recycled paper). These ingredients will decompose rapidly in a natural environment, thus furthering the sustainability of the product.

The filtration media of the filter disclosed herein is roughly 90.9% whole milled soybean and roughly 9.1% recycled paper by mass. As discussed above, these ingredients have been selected for their low cost, physical properties, and environmental friendliness.

The longevity and ability of the filter to withstand humidity has not been tested at this time. However, a cold Plasma treatment—which slows decomposition within organic matter—can be applied to the product, which should extend its lifespan due to the organic nature of the filter media. Alternatively, the product would also be able to be chemically treated to help it withstand humidity.

The general framework or structure holding filter media is similar to that of a conventional HVAC filter, e.g., a MERV 7 filter. The primary distinction being the filter media that goes into the filter itself. The two components of the filter media for the filter described herein are whole soybeans and recycled paper.

The production of the product itself is relatively simple. The recycled paper can be processed in a large-scale commercial shredder, and simply soaked in a large vat with NaOH. The soy, on the other hand, can be milled in a traditional milling facility and heated with the NaOH in a temperature controlled vat. The two mixtures must then be transported to a separate vat and blended together. After this, the paper can simply be processed in the traditional manner. The entire process would be able to take place at a paper mill. Assembly would then be able to take place at any regular filter manufacturing facility, as no special treatment is required post development of the media. The assembly of the filter, once the soy derived filter media has been produced, would be similar to that of a conventional HVAC filter. As such, the filter would be able to be produced in currently existing facilities with ease.

The exemplary soy derived filter described above has a number of advantages, including: FiltraSoy may be a successful product due to four main characteristics:

1) It is 14.67 percent more efficient than current residential and commercial level filters offered in the market
2) It has a lower price point than currently existing products, yet still maintains extremely high profit margins
3) It is more environmentally friendly than products currently available 4) It is the first and only filter that has been successfully treated with cold plasma, a treatment that is expected to extend the life and effectiveness of the filtration media due to the positive interaction between the high protein content within soy and the treatment As a whole, FiltraSoy may have a substantial impact within both the environmental and human health realms. Regarding the environment, FiltraSoy offers an environmentally friendly solution to air filtration within the marketplace. Most air filters are made from non-renewable resources and do not degrade naturally after use. FiltraSoy, on the other hand, is made of renewable resources and breaks down naturally after use, allowing the product to simply be composted as opposed to sitting in a landfill. The impact of this is greatened by the fact that air filter are a disposable good which is replaced on a regular basis. On the human health side, FiltraSoy has a higher filtration efficiency than competing products within the residential sector. Additionally, the cost of FiltraSoy is lower than these competing products, thus providing a highly efficient filter, capable of competing with hypo-allergenic MERV 12 filters, at an affordable price.

Testing and Calculations. Testing based on ASHRAE Standard 52.2 was conducted with dust sourced from a Frankfort, IN grain elevator and sieved through a #140 sieve to achieve a size congruent with particles able to be suspended in the air. Summary of results, cost of production and increased demand of soy calculations.

Test FiltraSoy Filtration Media

| Dust Type - Dust sourced from a Frankfort, IN grain elevator and sieved through a #140 sieve to achieve a size congruent with that of particles suspended in the air | | | | | | |
|---|---|---|---|---|---|---|
| Air Flow Rate (m/s) | Mass of Dust (g) | Weight of Boat, Initial (g) | Weight of Boat, Final (g) | Filter + Holder, Initial (g) | Filter + Holder, Final (g) | Change in Filter Mass (g) |
| 0.60 | 0.025 | 1.594 | 1.594 | 13.533 | 13.554 | 0.021 |
| 1.25 | 0.025 | 1.594 | 1.594 | 13.509 | 13.526 | 0.017 |
| 1.50 | 0.025 | 1.594 | 1.594 | 13.488 | 13.507 | 0.019 |
| 1.90 | 0.025 | 1.594 | 1.594 | 13.484 | 13.511 | 0.027 |
| 1.90 | 0.025 | 1.594 | 1.594 | 13.523 | 13.541 | 0.018 |
| 1.90 | 0.025 | 1.594 | 1.594 | 13.555 | 13.574 | 0.019 |
| 1.90 | 0.025 | 1.594 | 1.594 | 13.476 | 13.491 | 0.015 |
| 1.90 | 0.025 | 1.594 | 1.594 | 13.518 | 13.535 | 0.017 |
| 1.90 | 0.025 | 1.594 | 1.594 | 13.55 | 13.567 | 0.017 |
| 2.50 | 0.025 | 1.594 | 1.594 | 13.572 | 13.592 | 0.020 |
| 3.20 | 0.025 | 1.594 | 1.594 | 13.569 | 13.589 | 0.020 |
| 3.80 | 0.025 | 1.594 | 1.594 | 13.552 | 13.571 | 0.019 |
| | | | | | Average | 0.019 |

Test Current Commercial MERV 12 Filter

| Dust Type - Dust sourced from a Frankfort, IN grain elevator and sieved through a #140 sieve to achieve a size congruent with that of particles suspended in the air | | | | | | |
|---|---|---|---|---|---|---|
| Air Flow Rate (m/s) | Mass of Dust (g) | Weight of Boat, Initial (g) | Weight of Boat, Final (g) | Filter + Holder, Initial (g) | Filter + Holder, Final (g) | Change in Filter Mass (g) |
| 0.60 | 0.025 | 1.594 | 1.594 | 13.504 | 13.519 | 0.015 |
| 1.25 | 0.025 | 1.594 | 1.594 | 13.509 | 13.525 | 0.016 |
| 1.50 | 0.025 | 1.594 | 1.594 | 13.509 | 13.526 | 0.017 |
| 1.90 | 0.025 | 1.594 | 1.594 | 13.504 | 13.521 | 0.017 |
| 1.90 | 0.025 | 1.594 | 1.594 | 13.513 | 13.527 | 0.014 |
| 1.90 | 0.025 | 1.594 | 1.594 | 13.499 | 13.514 | 0.015 |
| 1.90 | 0.025 | 1.594 | 1.594 | 13.51 | 13.524 | 0.014 |
| 1.90 | 0.025 | 1.594 | 1.594 | 13.501 | 13.519 | 0.018 |
| 1.90 | 0.025 | 1.594 | 1.594 | 13.506 | 13.519 | 0.013 |
| 2.50 | 0.025 | 1.594 | 1.594 | 13.5 | 13.517 | 0.017 |
| 3.20 | 0.025 | 1.594 | 1.594 | 13.508 | 13.523 | 0.015 |
| 3.80 | 0.025 | 1.594 | 1.594 | 13.514 | 13.528 | 0.014 |
| | | | | | Average | 0.015 |

Summary of Testing Results

| | |
|---|---|
| FiltraSoy Filtration Efficiency (%) | 76.33 |
| MERV 12 Filtration Efficiency (%) | 61.67 |
| Percentage Efficiency Improvement of FiltraSoy over a MERV 12 Filter (%) | 14.67 |

While this invention has been described as having an exemplary design, the present invention may be further modified within the spirit and scope of this disclosure. This application is therefore intended to cover any variations, uses, or adaptations of the invention using its general principles.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected. It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

The invention claimed is:

1. A process of manufacturing an air filter comprising the steps of:
   a. cutting one or more recyclable fibrous materials;
   b. adding water to the cut recyclable fibrous materials followed by sodium hydroxide to afford a mixture of recyclable fibrous materials;
   c. digesting the mixture of recyclable fibrous materials for a period of time and washing the mixture with water to afford a paste of recyclable fibrous materials;
   d. milling dry soy into a fine powder;
   e. adding water to the fine powder of milled soy followed by sodium hydroxide to afford a mixture of water, milled soy and sodium hydroxide;
   f. heating the mixture of water, milled soy and sodium hydroxide and boiling for a period of time;
   g. cooling down the mixture and washing the mixture with water to remove sodium hydroxide to afford a paste of milled soy;
   h. combining and blending the paste of milled soy with the paste of recyclable fibrous materials to afford a smooth mixture; and
   i. casting and drying said smooth mixture to afford said air filter.

2. The process according to claim 1 further comprising a step of exposing said air filter to a high voltage cold plasma treatment.

3. The process according to claim 1, wherein the milled soy material accounts for about 1% to about 90% dry mass of the total material components of said filter.

4. The process according to claim 1, wherein the milled soy material accounts for about 10% to about 70% dry mass of the total material of said filter media.

5. The process according to claim 1, wherein the one or more recyclable fibrous material is paper or synthetic fibrous material.

6. The process according to claim 1, wherein the one or more recyclable fibrous material is recycled paper or recycled synthetic fibrous material.

7. The process according to claim 1, wherein said filter has a Minimum Efficiency Reporting Value (MERV) ranging from about 3 to about 12.

8. The process according to claim 1, wherein said filter is used for residential or commercial heating, ventilation and air conditioning.

* * * * *